US012524445B2

(12) United States Patent
Bhardwaj et al.

(10) Patent No.: US 12,524,445 B2
(45) Date of Patent: *Jan. 13, 2026

(54) SYSTEMS AND METHODS FOR COLD-START RECOMMENDATION USING LARGESCALE GRAPH MODELS

(71) Applicant: Walmart Apollo, LLC, Bentonville, AR (US)

(72) Inventors: Ankur Bhardwaj, Sunnyvale, CA (US); Afroza Ali, Los Altos, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,069

(22) Filed: Nov. 13, 2024

(65) Prior Publication Data

US 2025/0068659 A1    Feb. 27, 2025

Related U.S. Application Data

(63) Continuation of application No. 18/104,184, filed on Jan. 31, 2023, now Pat. No. 12,169,511.

(51) Int. Cl.
*G06F 16/28* (2019.01)
*G06F 16/22* (2019.01)
*G06F 16/901* (2019.01)

(52) U.S. Cl.
CPC ........ *G06F 16/288* (2019.01); *G06F 16/2237* (2019.01); *G06F 16/9024* (2019.01)

(58) Field of Classification Search
CPC .................................................... G06F 16/288
USPC ........................................................ 707/805
See application file for complete search history.

(56) References Cited

U.S. PATENT DOCUMENTS

| | | | |
|---|---|---|---|
| 10,032,131 B2 * | 7/2018 | Cheng | G06Q 10/10 |
| 2006/0080356 A1 * | 4/2006 | Burges | G06F 16/48 |
| 2006/0208185 A1 * | 9/2006 | Be'er | H01J 49/04 |
| | | | 250/282 |
| 2018/0081880 A1 | 3/2018 | Kennedy et al. | |
| 2019/0236674 A1 * | 8/2019 | Zhao | G06N 7/01 |
| 2020/0167849 A1 | 5/2020 | Xi et al. | |
| 2021/0295410 A1 * | 9/2021 | Su | G06Q 30/0631 |
| 2021/0326312 A1 | 10/2021 | White | |
| 2022/0253722 A1 | 8/2022 | Wu et al. | |

* cited by examiner

*Primary Examiner* — Syling Yen
(74) *Attorney, Agent, or Firm* — Morgan, Lewis & Bockius LLP; Manita Rawat

(57) ABSTRACT

Systems and methods of generating interfaces including recommended items selected by a graph-based cold-start (GCS) model are disclosed. A request for an interface is received and a set of interface items is generated for inclusion in the interface. The set of interface items is selected, at least in part, by a GCS model including a semantic similarity component and a viewed-also-viewed component. The set of interface items is generated based on a combination of an output of the semantic similarity component and an output of the viewed-also-viewed component. The interface including the set of interface items is generated and transmitted to a system that generated the request for the interface.

20 Claims, 10 Drawing Sheets

SYSTEMS AND METHODS FOR COLD-START RECOMMENDATION USING LARGESCALE GRAPH MODELS

CROSS-REFERENCE TO RELATED APPLICATION

This application is a continuation of U.S. patent application Ser. No. 18/104,184, filed Jan. 31, 2023, entitled "SYSTEMS AND METHODS FOR COLD-START RECOMMENDATION USING LARGESCALE GRAPH MODELS," the disclosure of which is incorporated by reference herein in its entirety.

TECHNICAL FIELD

This application relates generally to generation of network interfaces, and more particularly, to selection of content items for inclusion in network interfaces.

BACKGROUND

Current network interfaces include content generated by content suggestion mechanisms. Content within the interface is selected based on large trends, such as seasonal trends, platform-wide trends, or user specific data. The content is selected to a user via a network interface page. Current content selection and recommendation systems rely on active signals to identify items or content elements that are receiving a high volume of traffic.

Current content recommendation systems utilize user interactions to identify recommended items. Relying on current user interactions creates a feedback cycle that limits recommended items to a small percentage of items available in a catalog. For example, a small percentage of items are exposed to users via a recommendation system, which results in interaction with that small percentage of items. Because the small percentage of items have high interaction rates, those items are likely to be recommended by current recommendation systems, resulting in additional interactions, and thus additional recommendations. Current systems are not able to surface or effectively include items with low or no prior user interaction.

SUMMARY

In various embodiments, a system is disclosed. The system includes a non-transitory memory and a processor. The processor is configured to read a set of instructions to receive a request for an interface, generate a set of interface items for inclusion in the interface, generate the interface including the set of interface items, and transmit the interface to a system that generated the request for the interface. The set of interface items is selected at least in part by a graph-based cold-start (GCS) model including a semantic similarity component and a viewed-also-viewed component. The set of interface items is generated based on a combination of an output of the semantic similarity component and an output of the viewed-also-viewed component.

In various embodiments, a computer-implemented method is disclosed. The computer-implemented method includes the steps of receiving a request for an interface, generating, by a graph-based cold start model, a sparse distance matrix and a co-viewed weighted matrix, generating a set of interface items for inclusion in the interface, generating the interface including the set of interface items, and transmitting the interface to a system that generated the request for the interface. The set of interface items is selected based at least in part on a combination of the sparse distance matrix and the co-viewed weighted matrix.

In various embodiments, a computer-implemented method is disclosed. The computer-implemented method includes the steps of receiving a request for an interface, generating, by a graph-based cold start model, a sparse distance matrix and a co-viewed weighted matrix, and combining the sparse distance matrix and the co-viewed weighted matrix to generate an adjacency matrix. Each node of the graph is representative of an item in a catalog of items and each edge in the graph is representative of a relationship value between the item and a second item in the catalog of items. The computer-implemented method further includes the steps of converting the adjacency matrix to a graph, traversing the graph to identify a set of candidate items, generating, by a ranking module, a set of ranked items by ranking the set of candidate items, selecting a set of interface items for inclusion in the interface, generating the interface including the set of interface items, and transmitting the interface to a system that generated the request for the interface. The set of interface items is selected from the set of ranked items in descending rank order.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
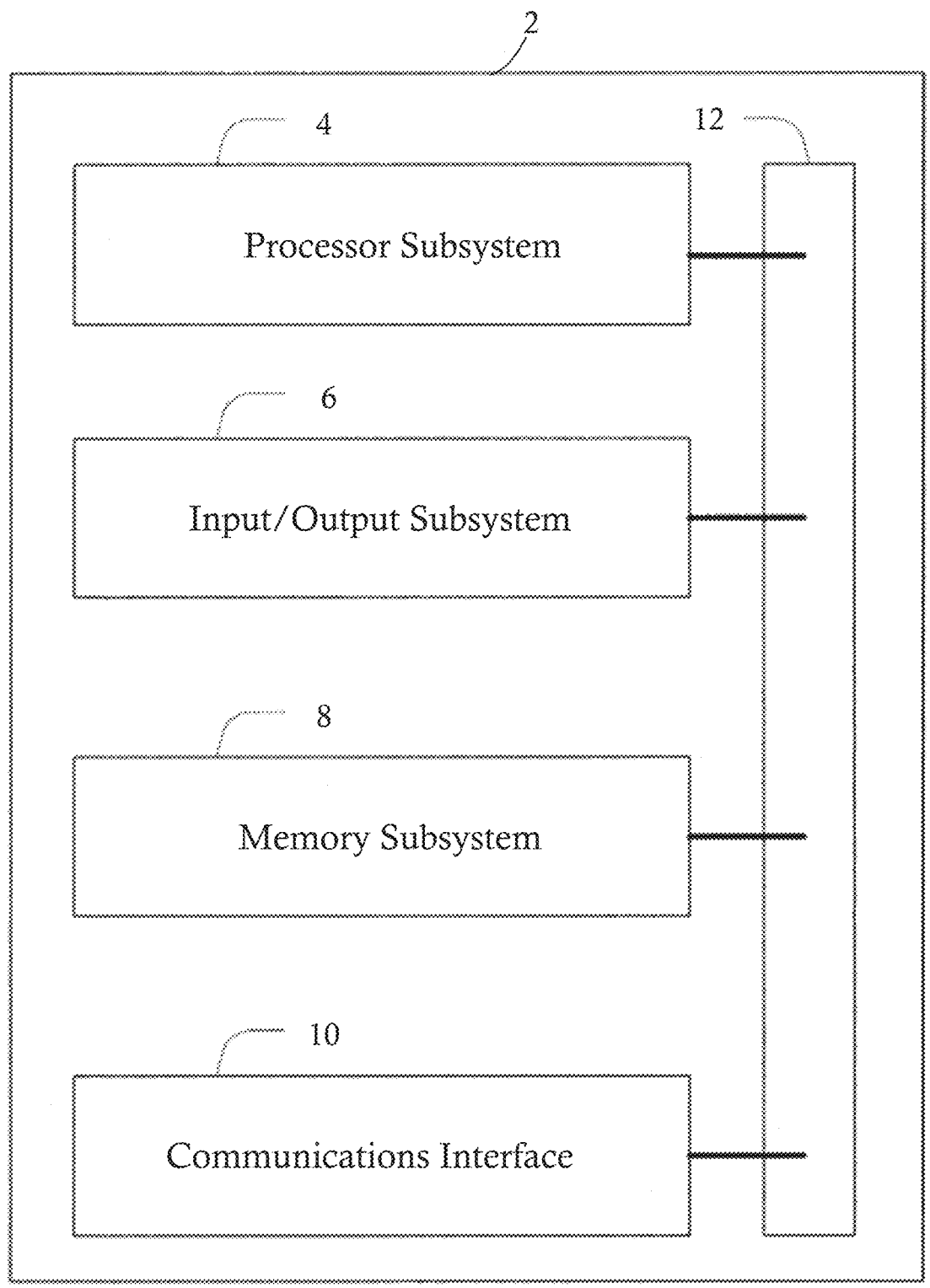
FIG. 1 illustrates a computer system configured to implement one or more processes, in accordance with some embodiments.

This description of the exemplary embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein can be assigned to the other claimed objects and vice versa. In other words, claims for the systems can be improved with features described or claimed in the context of the methods. In this case, the functional features of the method are embodied by objective units of the systems.

Furthermore, in the following, various embodiments are described with respect to methods and systems for generating interfaces including cold-start recommendations based on a largescale graph model. In various embodiments an interface generation system is configured to generate item recommendations using a graph-based cold-start (GCS) recommendation model. The GCS recommendation model includes a cold-start component, a hot item component, and a combined recommendation component. The GCS recommendation model is configured to output a set of recommended interface items combining both active, or hot, items and inactive, or cold, items.

In some embodiments, systems, and methods for generating a network interface including cold-start recommendations based on largescale graph models includes a trained GCS recommendation model including a cold-start component configured to surface inactive, or cold, items, a hot item component configured to provide hot item recommendations, and a combination recommendation component. The cold-start component can include a semantic similarity model configured to generate a distance matrix for a set of items and the hot item component can include a viewed-also-viewed model configured to generate a co-view weighted matrix. The distance matrix and the co-view weighted matrix can be combined into a product graph adjacency matrix and a ranking algorithm, such as a Personalized PageRank algorithm, can be applied to the product graph adjacency matrix.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can comprise a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network, or a convolutional deep neural network. Furthermore, a neural network can be an adversarial network, a deep adversarial network and/or a generative adversarial network.

In various embodiments, a neural network which is trained (e.g., configured or adapted) to generate combined cold-start and hot item recommendations, is disclosed. A neural network trained to generate combined cold-start and hot item recommendations may be referred to as a trained graph based cold-start (GCS) model and/or trained cold-start recommendation model. The trained GCS model can be configured to provide item recommendations selected from a catalog of items for inclusion in a network interface utilizing a cold-start component and a hot item component. The GCS model is configured to provide cold-start recommendations for new, unviewed, or under-utilized items in a catalog.

FIG. 1 illustrates a computer system configured to implement one or more processes, in accordance with some embodiments. The system 2 is a representative device and can include a processor subsystem 4, an input/output subsystem 6, a memory subsystem 8, a communications interface 10, and a system bus 12. In some embodiments, one or more than one of the system 2 components can be combined or omitted such as, for example, not including an input/output subsystem 6. In some embodiments, the system 2 can include other components not combined or comprised in those shown in FIG. 1. For example, the system 2 can also include, for example, a power subsystem. In other embodiments, the system 2 can include several instances of the components shown in FIG. 1. For example, the system 2 can include multiple memory subsystems 8. For the sake of conciseness and clarity, and not limitation, one of each of the components is shown in FIG. 1.

The processor subsystem 4 can include any processing circuitry operative to control the operations and performance of the system 2. In various aspects, the processor subsystem 4 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also can be implemented by a controller, a microcontroller, an application specific integrated circuit (ASIC), a field programmable gate array (FPGA), a programmable logic device (PLD), and so forth.

In various aspects, the processor subsystem 4 can be arranged to run an operating system (OS) and various applications. Examples of an OS comprise, for example, operating systems generally known under the trade name of Apple OS, Microsoft Windows OS, Android OS, Linux OS, and any other proprietary or open-source OS. Examples of applications comprise, for example, network applications, local applications, data input/output applications, user interaction applications, etc.

In some embodiments, the system 2 can include a system bus 12 that couples various system components including the processor subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 6 can include any suitable mechanism or component to enable a user to provide input to system 2 and the system 2 to provide output to the user. For example, the input/output subsystem 6 can include any suitable input mechanism, including but not limited to, a button, keypad, keyboard, click wheel, touch screen, motion sensor, microphone, camera, etc.

In some embodiments, the input/output subsystem 6 can include a visual peripheral output device for providing a display visible to the user. For example, the visual peripheral output device can include a screen such as, for example, a Liquid Crystal Display (LCD) screen. As another example, the visual peripheral output device can include a movable display or projecting system for providing a display of content on a surface remote from the system 2. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 4. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 can include any suitable hardware, software, or combination of hardware and software that is capable of coupling the system 2 to one or more networks and/or additional devices. The communications interface 10 can be arranged to operate with any suitable technique for controlling information signals using a desired set of communications protocols, services, or operating procedures. The communications interface 10 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 can include a wireless interface comprising one or more antennas, transmitters, receivers, transceivers, amplifiers, filters, control logic, and so forth.

In various aspects, the communications interface 10 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac/ax/be, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, the Wi-Fi series of protocols including Wi-Fi Legacy, Wi-Fi 1/2/3/4/5/6/6E, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electromagnetic induction (EMI) techniques. An example of EMI techniques can include passive or active radio-frequency identification (RFID) protocols and devices. Other suitable protocols can include Ultra-Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 can include any machine-readable or computer-readable media capable of storing data, including both volatile/non-volatile memory and removable/non-removable memory. The memory subsystem 8 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 2.

In various aspects, the memory subsystem 8 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 can contain an instruction set, in the form of a file for executing various methods, such as methods for generating network interfaces including recommended cold-start items based on largescale graph models, as described herein. The instruction set can be stored in any acceptable form of machine-readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processor subsystem 4.

Figure 2:
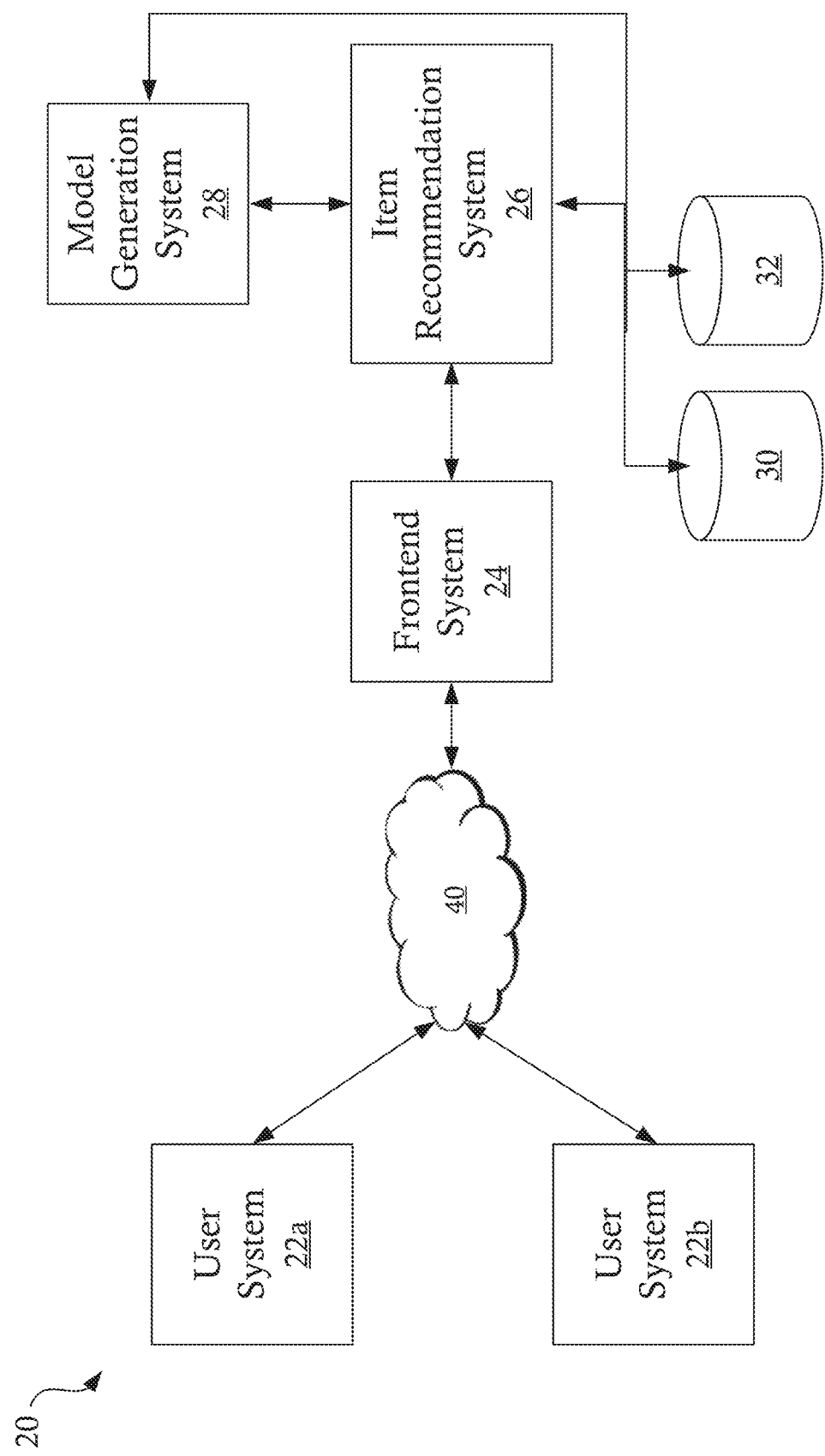
FIG. 2 illustrates a network environment configured to provide cold-start item recommendations, in accordance with some embodiments.

FIG. 2 illustrates a network environment 20 configured to provide a network interface including cold-start recommendations based on largescale graph models, in accordance with some embodiments. The network environment 20 includes a plurality of systems configured to communicate over one or more network channels, illustrated as network cloud 40. For example, in various embodiments, the network environment 20 can include, but is not limited to, one or more user systems 22a, 22b, a frontend system 24, an item recommendation system 26, a model training system 28, an item catalog database 30, a model store database 32, and/or any other suitable system or component. It will be appreciated that any of the illustrated systems can include a system as described above in conjunction with FIG. 1. Although specific embodiments are discussed, herein it will be appreciated that additional systems, servers, storage mechanism, etc. can be included within the network environment 20.

Further, although embodiments are illustrated herein having individual, discrete systems, it will be appreciated that, in some embodiments, one or more systems can be combined into a single logical and/or physical system. For example, in various embodiments, the frontend system 24, the item recommendation system 26, the model training system 28, the item catalog database 30, and the model store database 32 can be combined into a single logical and/or physical system. Similarly, although embodiments are illustrated having a single instance of each system, it will be appreciated that additional instances of a system can be implemented within the network environment 20. In some embodiments, two or more systems can be operated on shared hardware in which each system operates as a separate, discrete system utilizing the shared hardware, for example, according to one or more virtualization schemes.

In some embodiments, the user systems 22a, 22b are configured to receive and/or generate a user interface to allow a user to interact with services and/or resources provided by a network system, such as frontend system 24. The user interface can include any suitable interface, such as, for example, a mobile device application interface, a network interface, and/or any other suitable interface. For example, in some embodiments, the frontend system 24 includes an interface generation engine configured to generate a customized network interface and provide the customized network interface, and/or instructions for generating the customized network interface, to a user system 22a, 22b, which displays the user interface via one or more display elements. The customized network interface can include any suitable network interface, such as, for example, an e-commerce interface, a service interface, an intranet interface, and/or any other suitable user interface. In some embodiments, the customized interface includes a webpage, web portal, intranet page, application page, and/or other interactive interface. The customized network interface includes cold-start recommended items provided, at least in part, by a trained GCS model.

In some embodiments, the frontend system 24 is in signal communication with an item recommendation system 26. The item recommendation system 26 is configured to implement a recommendation engine to generate item recommendations for inclusion within an interface generated by the frontend system 24. In some embodiments, the recommendation engine includes a GCS model configured to provide mixed cold-start and hot item recommendations. The GCS model includes a cold-start component, a hot item component, and a combined recommendation component. In some embodiments, the GCS model generates a set of top N cold item recommendations and a set of top M hot item recommendations. A set of recommended items is generated by ranking a combined set of the top N cold item recommendations and the top M hot item recommendations. In some embodiments, the GCS model is configured to balance the set of recommended items to include a higher percentage of cold-item recommendations as compared to hot item recommendations.

In various embodiments, the system or components thereof can comprise or include various modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multi-threading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the examples herein.

Figure 3:
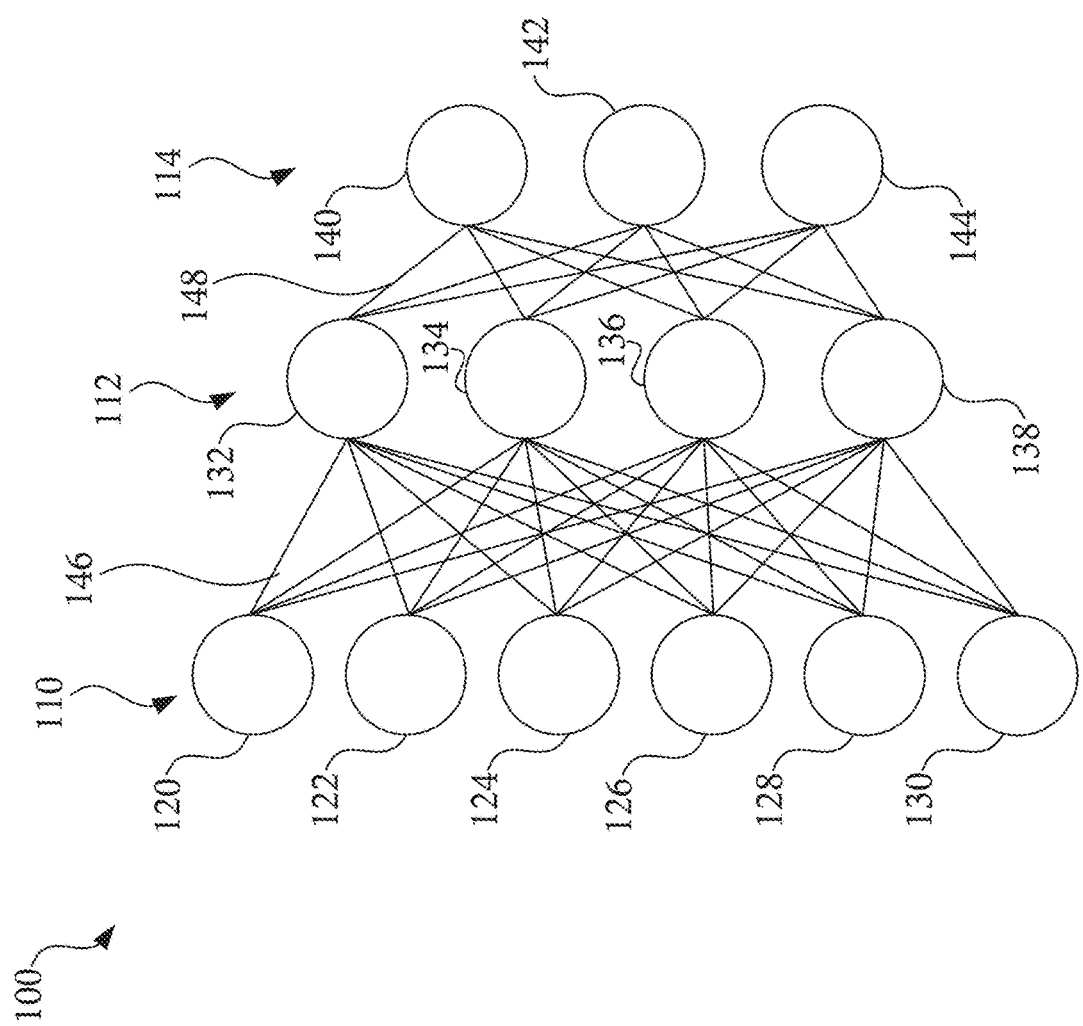
FIG. 3 illustrates an artificial neural network, in accordance with some embodiments.

FIG. 3 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 can be arranged in layers 110-114, wherein the layers can comprise an intrinsic order introduced by the edges 146-148 between the nodes 120-144. In particular, edges 146-148 can exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 can be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number can be assigned as a value to every node 120-144 of the neural network 100. Here, $x_i^{(n)}$ denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 can comprise a weight being a real number, in particular, the weight is a real number within the interval $[-1, 1]$, within the interval $[0, 1]$, and/or within any other suitable interval. Here, $w_{i,j}^{(m,n)}$ denotes the weight of the edge between the i-th node 120-138 of the m-th layer 110, 112 and the j-th node 132-144 of the n-th layer 112, 114. Furthermore, the abbreviation $w_{i,j}^{(n)}$ is defined for the weight $w_{i,j}^{(m,n+1)}$.

In particular, to calculate the output values of the neural network 100, the input values are propagated through the neural network. In particular, the values of the nodes 132-144 of the (n+1)-th layer 112, 114 can be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 can be calculated based on the values of the input layer 110 of the neural network and/or based on the values of a prior hidden layer, etc.

In order to set the values $w_{i,j}^{(m,n)}$ for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}'^{(n)} = w_{i,j}^{(n)} - \gamma \cdot \delta_j^{(n)} \cdot x_i^{(n)}$$

wherein $\gamma$ is a learning rate, and the numbers $\delta_j^{(n)}$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta_j^{(n+1)}$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 114, wherein f' is the first derivative of the activation function, and $y_j^{(n+1)}$ is the comparison training value for the j-th node of the output layer 114.

In some embodiments, the neural network 100 is configured, or trained, to generate a set of recommended items including cold-start recommended items. For example, in some embodiments, the neural network 100 is configured as a GCS neural network. As discussed in greater detail herein, a GCS network includes a cold-start component, a hot item component, and a combined recommendation component. The GCS network is configured to output a set of recommended interface items combining both active, or hot, items and inactive, or cold, items.

Figure 4:
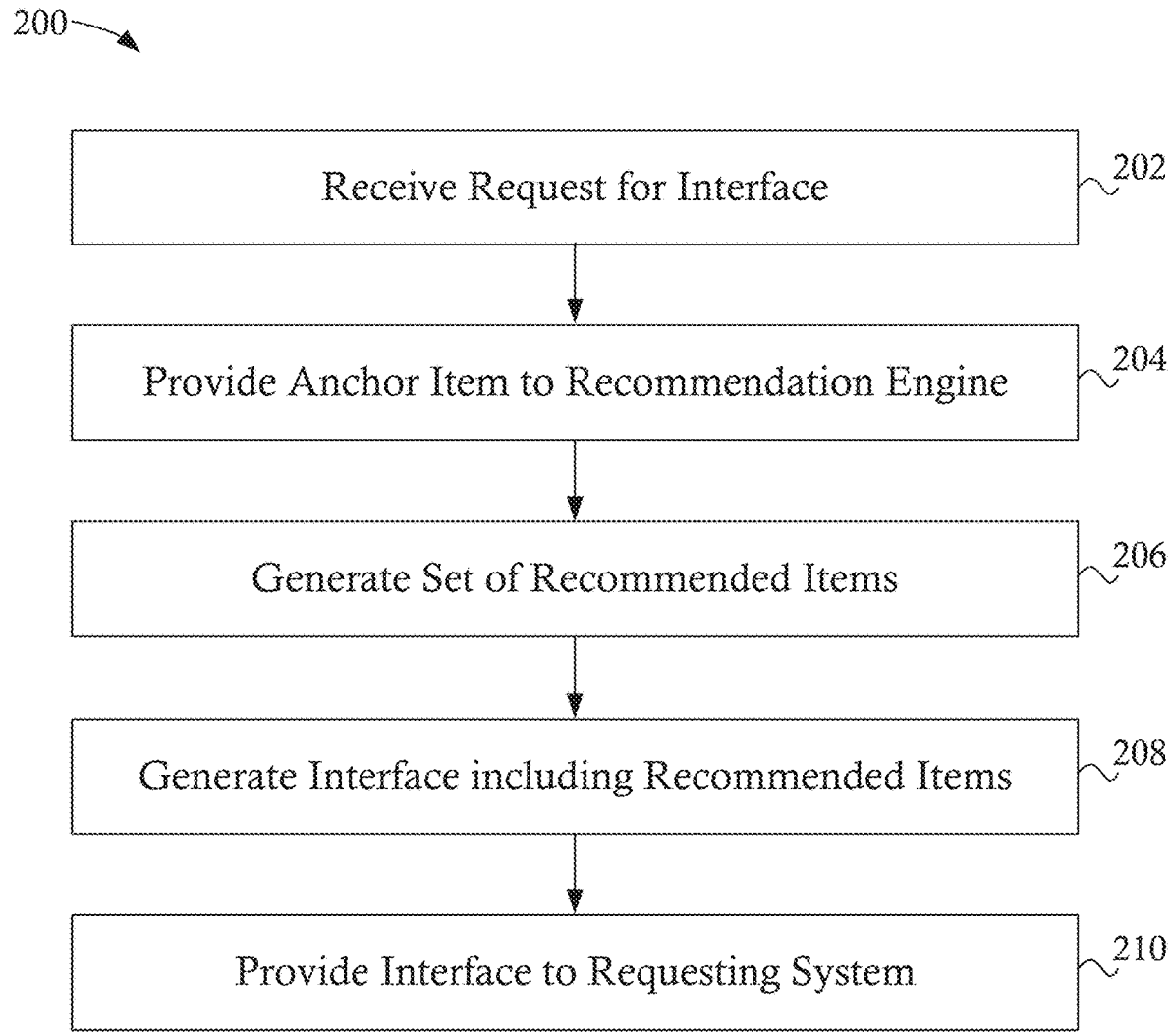
FIG. 4 is a flowchart illustrating a method of generating an interface including cold-start item recommendations generated via largescale graph, in accordance with some embodiments.
Figure 5:
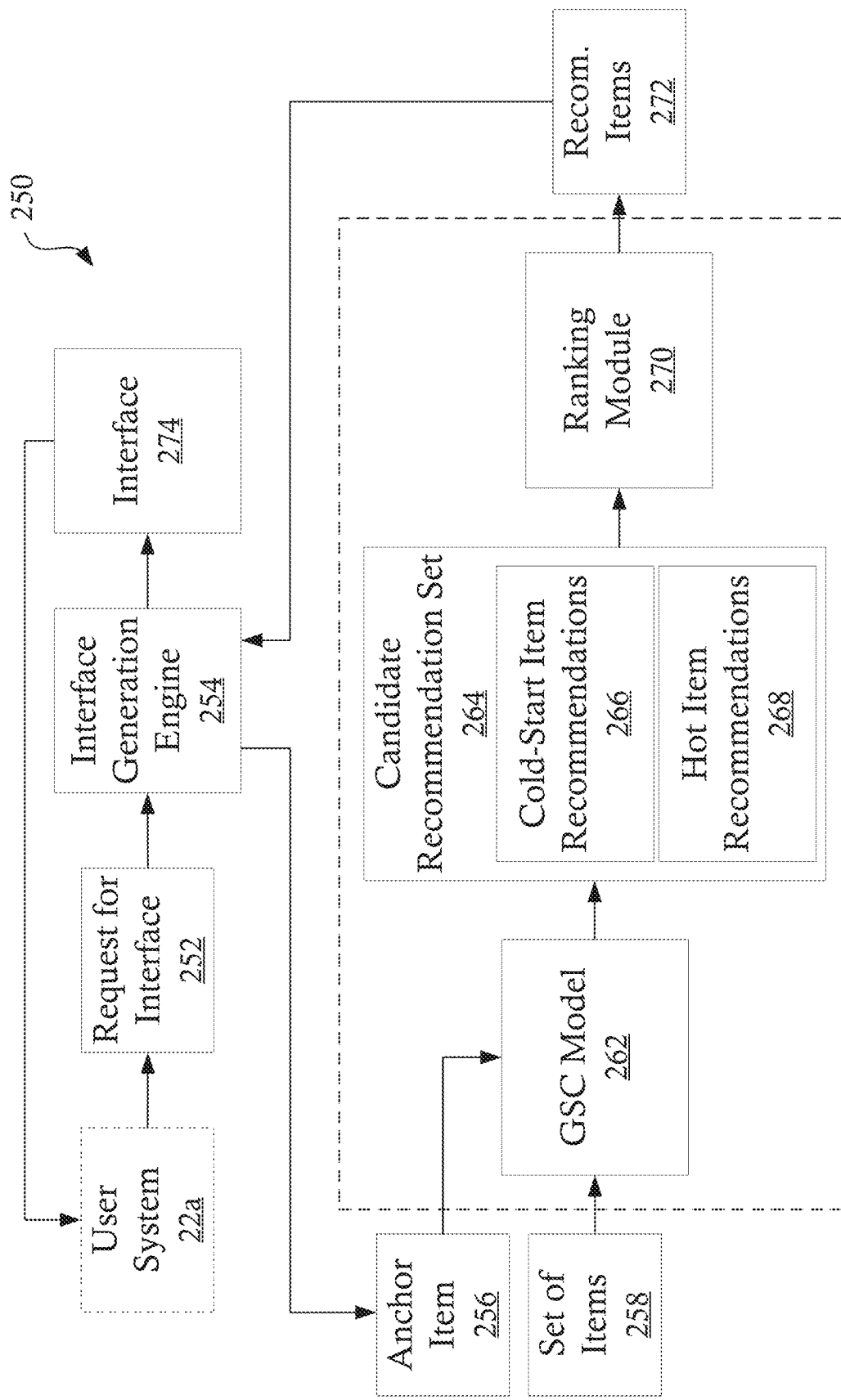
FIG. 5 is a process flow illustrating various steps of the method of the method of generating an interface including cold-start item recommendations generated via largescale graph, in accordance with some embodiments.

FIG. 4 is a flowchart illustrating a method 200 of generating an interface including cold-start item recommendations generated via a largescale graph, in accordance with some embodiments. FIG. 5 is a process flow 250 illustrating various steps of the method of the method of generating an interface including cold-start item recommendations generated via largescale graph, in accordance with some embodiments. At step 202, a request 252 for an interface is received. The request 252 can be generated by any suitable system, such as a user system 22a, and received by any suitable system or component, such as an interface generation engine 254. In some embodiments, the request 252 includes a request for an interface including one or more recommended items.

At step 204, an anchor item 256 is identified and provided to a recommendation engine 260. The anchor item 256 can include an item selected from a catalog of items associated with a network interface. For example, in an e-commerce context, the anchor item 256 can include an item selected from a catalog of items available for purchase on the e-commerce interface. Although specific embodiments are discussed herein, it will be appreciated that the anchor item 256 can include any suitable item or electronic representation that can be used for identifying similar component in a catalog of items.

In some embodiments, the anchor item 256 is identified based on information received in the request 252 for the interface. For example, in some embodiments, the request 252 includes an item identifier or other data identifying the anchor item 256. The request 252 can include a search request identifying the anchor item 256 and/or the anchor item 256 can be identified by a search engine (not shown) operating on a search string provided in the request 252. In some embodiments, the anchor item 256 is an item selected by a user via a network interface page, such as via a browse tree or other network interface page.

At step 206, a set of recommended items 272 is selected from a set of candidate items 258 based on the received anchor item 256. In some embodiments, the set of recommended items 272 is generated by a graph-based cold-start (GCS) model 262 and a ranking module 270 implemented and/or executed by the recommendation engine 260. As discussed in greater detail below, the GCS model 262 is configured to generate a set of combined candidate items 264 including cold-start candidate items 266, e.g., items having no or little interaction data, items that have stale or old interaction data, etc., and hot candidate items 268, e.g., items that have high or current interaction data. The combined candidate item set 264 can be ranked by a ranking module 270 to generate the set of recommended items 272.

Figure 6:
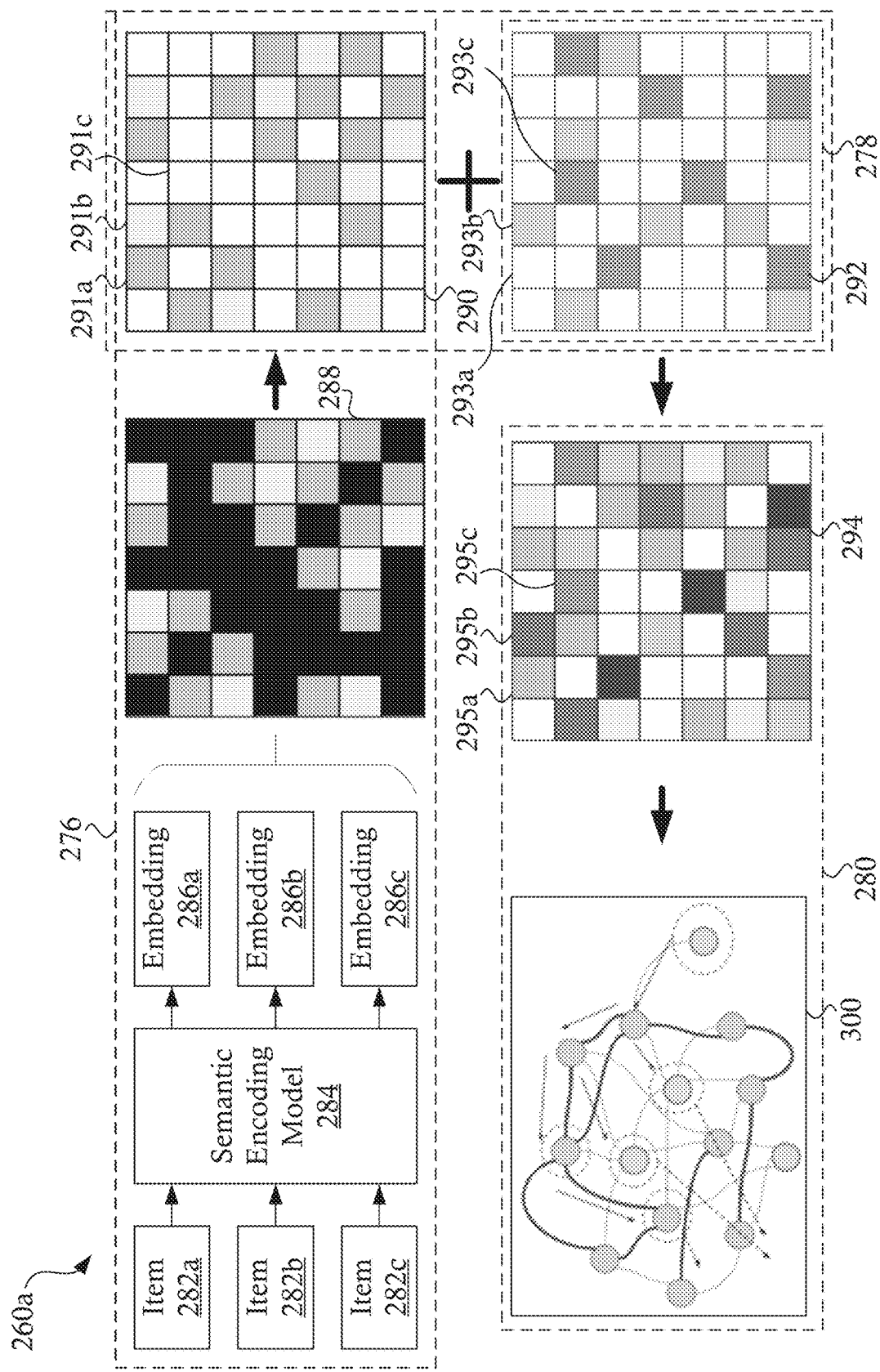
FIG. 6 illustrates a graph-based recommendation model, in accordance with some embodiments.

FIG. 6 illustrates a GCS model 262a, in accordance with some embodiments. The GCS model 262a is a graph-based model configured to generate a set of recommend items including cold-start items and hot items. In some embodiments, the GCS model 262a includes a semantic similarity component 276, a viewed-also-viewed component 278, and a combined recommendation component 280. Although embodiments are discussed herein with a discrete semantic similarity component 276, viewed-also-viewed component 278, and combined recommendation component 280, it will be appreciated that the discrete components can be combined into a single trained model and are discussed herein as discrete components for convenience.

The semantic similarity component 276 is configured to generate (or identify) a set of cold-start item candidates, such as the cold-start item candidates 266. The semantic similarity component 276 is configured to receive a set of item features 282a-282c and generate a sparse distance matrix 288 for cold items included in a catalog. The item features 282a-282c can include any suitable semantic item feature, such as a name or title. In some embodiments, the item features 282a-282c represent a set of items selected from an item catalog associated with a network interface. The set of items can include all of the items in the item catalog or a subset thereof, such as a subset associated with a specific category within the catalog. Categories within a catalog can include, but are not limited to, item groupings such as departments, item types, contexts, etc.

In some embodiments, a semantic encoding model 284 is configured to receive each of the item features 282a-282c and generate a set of corresponding embeddings 286a-286c. The semantic encoding model 284 can include any suitable encoding model, such as, for example, a Bidirectional Encoder Representations from Transformers (BERT) model. The semantic encoding model 284 includes a plurality of hidden layers, such as transformer layers and/or feedforward layers configured to convert the semantic item features 282a-282c into corresponding embeddings 286a-286c in an embedding, e.g., vector, space.

In some embodiments, the embeddings 286a-286c are combined in a distance matrix 288. The distance matrix 288 includes cells representative of a distance between each of the embeddings 286a-286c generated for each of the item features 282a-282c. The distance matrix 288 can include a square matrix, although it will be appreciated that any suitable matrix can be used. The distance matrix 288 can include a matrix having any suitable size corresponding to the number of items in the set of candidate items 258. For example, in some embodiments, the set of candidate items 258 can include N items, where N is a positive integer, and the distance matrix 288 can be an N×N matrix, although it will be appreciated that other suitable matrix representations can be used.

In some embodiments, the semantic similarity component 276 is configured to prune or reduce the distance matrix 288 to generate a spare distance matrix 290. For example, in some embodiments, edges above and/or below a predetermined threshold, e.g., edges corresponding to pairwise distances above and/or below a predetermined threshold, can be removed from the distance matrix 288. It will be appreciated that the sparse distance matrix 290 the same dimensions as the distance matrix 288.

Figure 7:
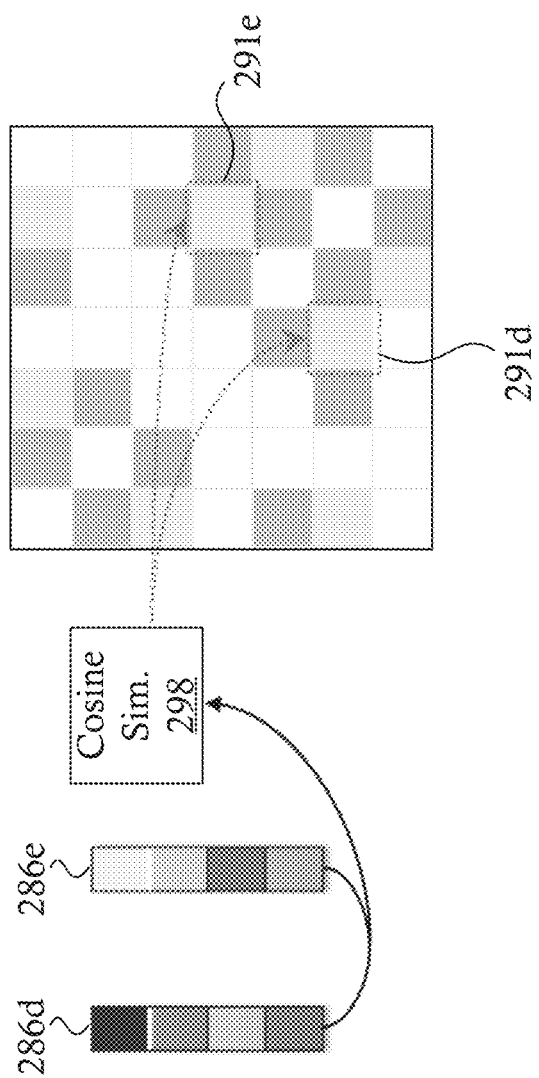
FIG. 7 illustrates a process of generating a semantic similarity matrix, in accordance with some embodiments.

The distance matrices 288, 290 can include cells having values corresponding to any suitable distance between a pair of item embeddings, such as a pairwise distance, a cosine distance, and/or any other suitable distance. FIG. 7 illustrates a process of generating a distance matrix 288a, in accordance with some embodiments. As shown in FIG. 7, a first embedding 286d and a second embedding 286e, each representative of an item in the set of candidate items 258, are provided to a cosine similarity module 298 configured to calculate a cosine similarity between the first embedding 286d and the second embedding 286e. The cosine similarity value is provided to a distance matrix, such as the sparse distance matrix 290a illustrated in FIG. 7, and populated into two cells, a first cell 291d in a row corresponding to the first embedding 286d and a column corresponding to the second embedding 286e and, similarly, a second cell 291e in a row corresponding to the second embedding 286e and a column corresponding to the first embedding 286d. Although FIG. 7 includes a sparse distance matrix 290, it will be appreciated that any distance matrix, such as distance matrix 288, can be generated by applying a suitable distance calculation, such as a cosine distance or pairwise distance calculation, to a set of embeddings representative of an item pair selected from the set of candidate items 258.

In some embodiments, the GCS model 262a includes a viewed-also-viewed component 278 configured to generate hot item recommendations. For example, the GCS model 262a can include a viewed-also-viewed component 278 configured to generate a co-viewed weighted sparse matrix 292. The co-viewed weighted sparse matrix 292 can include a square matrix identifying related, or co-viewed, items within the set of candidate items 258 based on historical interaction data. The co-viewed weighted sparse matrix 292 can include a personalized matrix generated using user-specific historical interaction data and/or a platform-specific matrix generated using non-user specific and/or aggregated historical interaction data.

In some embodiments, the co-viewed weighted sparse matrix 292 includes a distance matrix, such as a pairwise distance, between items that are included within sets of historical interaction data, e.g., sets of data corresponding to the same user identifier, sets of data corresponding to the same context, sets of data corresponding to the same interaction session, etc. The co-viewed weighted sparse matrix 292 can include a matrix having any suitable size, for example, a size corresponding to the number of items in the set of candidate items 258. In some embodiments, the dimensions of the co-viewed weighted sparse matrix 292 are equal to the dimensions of the sparse distance matrix 290.

In some embodiments, the GCS model 262a is configured to generate a graph adjacency matrix 294 by combining the sparse distance matrix 290 and the co-viewed weighted sparse matrix 292 into a single N×N matrix. The graph adjacency matrix 294 includes pairwise distances for both cold items as provided by the sparse distance matrix 290 and hot items as provided by the co-viewed weighted sparse matrix 292. In some embodiments, the graph adjacency matrix 294 includes a relationship score for each potential pairing of items within a set of candidate items. A relationship score for a selected pair of items can be generated by combining a first relationship score, e.g., a distance score from the sparse distance matrix 290, and a second relationship score, e.g., a distance score from the co-viewed weighted sparse matrix 292.

For example, as illustrated in FIG. 6, a sparse distance matrix 290 can include a non-zero relationship score, e.g., a non-zero distance value, for a relationship between a first item and a second item, as represented by cell 291a of the sparse distance matrix 290. The corresponding relationship value, e.g., the corresponding cell 293a representative of an item pair including the first item and the second item, in the co-viewed weighted sparse matrix 292 is empty, indicating that there was no hot item relationship between the first item and the second item and/or the relationship value between the first item and the second item was above and/or below a predetermined threshold. In the combined graph adjacency matrix 294, the relationship value of the corresponding item pair including the first item and the second item, e.g., the value of the corresponding cell 295a in the graph adjacency matrix 294 is equal to the relationship value of the corresponding cell 291a in the sparse distance matrix 290.

As another example, as illustrated in FIG. 6, a sparse distance matrix 290 can omit a relationship score, e.g., a zero or empty distance value, for a relationship between a second item and a fourth item, as represented by cell 291b of the sparse distance matrix 290. The corresponding relationship value, e.g., the corresponding cell 293b representative of an item pair including the second item and the fourth item, in the co-viewed weighted sparse matrix 292 includes a non-zero relationship score. In the combined graph adjacency matrix 294, the relationship value of the corresponding item pair including the second item and the fourth item, e.g., the value of the corresponding cell 295b in the graph adjacency matrix 294 is equal to the relationship value of the corresponding cell 293a in the co-viewed weighted sparse matrix 292.

As yet another example, as illustrated in FIG. 6, a sparse distance matrix 290 can include a non-zero relationship score, e.g., a non-zero distance value, for a relationship between a first item and a third item, as represented by cell 291c of the sparse distance matrix 290. The corresponding relationship value, e.g., the corresponding cell 293c representative of an item pair including the first item and the third item, in the co-viewed weighted sparse matrix 292 similarly includes a non-zero relationship score. In the combined graph adjacency matrix 294, the relationship value of the corresponding item pair including the first item and the third item, e.g., the value of the corresponding cell 295c in the graph adjacency matrix 294 is a combination of the relationship values within the corresponding cells 291c, 293c in the sparse distance matrix 290 and the co-viewed weighted sparse matrix 292.

Figure 8:
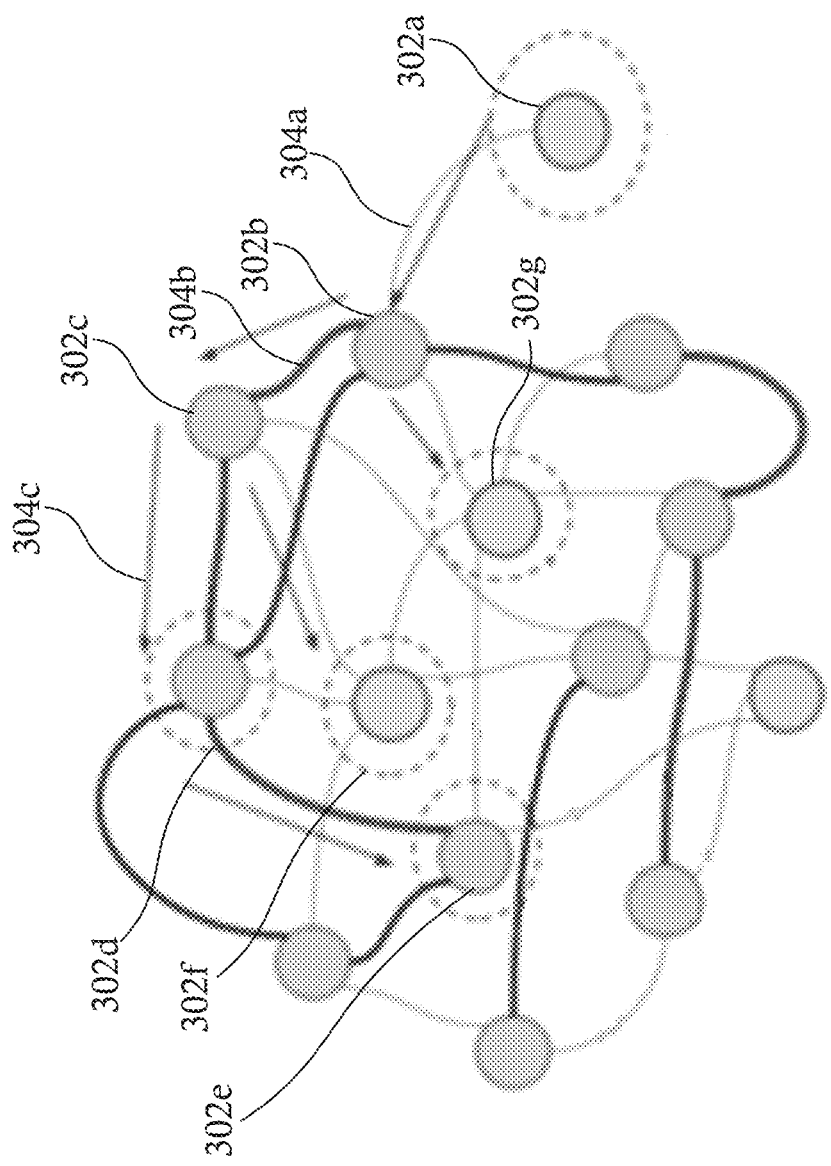
FIG. 8 illustrates a Personalized PageRank model, in accordance with some embodiments.

In some embodiments, the GCS model 262a is configured to convert the graph adjacency matrix 294 into an adjacency graph 300. As illustrated in FIG. 8, the adjacency graph 300 includes a plurality of nodes 302a-302g (collectively referred to herein as "nodes 302") and a plurality of edges 304a-304c (collectively referred to herein as "edges 304") extending between and connecting the nodes 302. In some embodiments, the nodes 302 are representative of each item 282a-282c in the set of candidate items 258 and the edges 304 are representative of weighted relationship scores between pairs of items 282a-282c in the set of candidate items 258.

In some embodiments, the GCS model 262a is configured to implement a graph traversal process to generate a set of cold item recommendations 266, a set of hot item recommendations 268, and/or a set of combined cold and hot items recommendations. The graph traversal process can include any suitable graph traversal process or algorithm. For example, in some embodiments, a Personalized PageRank Process is applied to traverse the adjacency graph 296. An anchor item, such as a determined anchor item 256 and/or a cold-start anchor item, can be provided as a starting point for the graph traversal process. In the illustrated embodiment, a starting node 302a is representative of the anchor item 256. A graph traversal process, such as a Personalized PageRank Process, traverses the graph and identifies a set of output nodes, such as nodes 302d, 302e representative of a hot item recommendation (e.g., representative of an item identified in the co-viewed weighted sparse matrix 292 as generated by a viewed-also-viewed component 278) and nodes 302f, 302g representative of cold item recommendations (e.g., representative of an item identified in the sparse distance matrix 290 as generated by a semantic similarity component 276). The selected nodes 302d-302g are representative of items included in a candidate recommendation set 264.

The candidate recommendation set 264 can include a predetermined number of items identified by a graph traversal process. For example, in some embodiments, the graph traversal process is configured to identify a set of M items, where M is a positive integer. The candidate recommendation set 264 can include a predetermined percentage of cold-start items and hot items. For example, in some embodiments, the graph traversal process is configured to generate a candidate recommendation set 264 including a first percentage of cold-start items and a second percentage of hot items. The percentages can include any suitable percentage split, such as, for example 90% cold-start items, 10% hot items, 80% cold-start items, 20% hot items, 75% cold-start items, 25% hot items, 70% cold-start items, 30% hot items, etc. Although embodiments are disclosed herein including a higher percentage of cold-start items, it will be appreciated that the graph traversal process can be configured to generate a higher percentage of hot items, in accordance with some embodiments.

The GCS model 262 includes independently scalable sub-components, such as an independently scalable semantic similarity component 276, an independently scalable viewed-also-viewed component 278, an independently scalable combined recommendation component 280, and independently scalable adjacency graph 300 and associated graph traversal process, etc. The components of the GCS model 262 can be executed in series and/or in parallel and multiple instances of each component can be executed in parallel. For example, multiple graph traversal processes, each having a different starting anchor item, can be executed simultaneously to generate item recommendations for different anchor items.

Similarly, sub-portions of each component can be parallelized. For example, multiple embedding encoding models 284 and/or distance calculation models, such as cosine similarity module 298, can be executed simultaneously to generate item embeddings 286a-286c and calculate distance values for populating a distance matrix 288. Similarly, multiple viewed-also-viewed processes can be executed in parallel to calculate values for populating the co-viewed weighted sparse matrix 292. It will be appreciated that any suitable portion of the GCS model 262 and/or any suitable sub-portion can be executed as a parallel and/or series process, as appropriate.

The disclosed GCS model 262 can be configured to be computationally inexpensive. In some embodiments, each iteration of a GCS model 262 can include approximations and/or optimizations to reduce the computational cost at each step. For example, in some embodiments, a power method can be adopted for computing Personalized PageRank vectors during a graph traversal process. Similarly, the item embeddings 286a-286c, such as embeddings generated by a BERT embedding process, can have a reduced number of dimensions to provide for faster downstream computations.

With reference again to FIGS. 4-5, in some embodiments, the recommendation engine 260 includes a ranking module 270 configured to rank items in the candidate recommendation set 264. The ranking module 270 can include any suitable ranking model, such as, for example, pairwise ranking models, listwise ranking models, re-ranking models (e.g., GlobalRerank, Personalized Reranking, deep listwise context model (DLCM)), and/or any other suitable ranking model.

In some embodiments, a set of recommended items 272 is output from the recommendation engine 260. The set of recommended items 272 can include a set of the top ranked N items selected from the candidate recommendation set 264, as ranked by the ranking module 270. In some embodiments, the ranking module 270 is configured to separately rank cold-start item recommendations 266 and hot item recommendations 268 and generate a set of recommended items 272 by combing the first N top rated cold-start items and the first M top rated hot items. In some embodiments, the number of cold-start items N is higher than the number of hot items M.

At step 208, an interface 274 including one or more items selected from the set of recommended items 272 is generated. In some embodiments, the set of recommended items 272 is provided to the interface generation engine 254. The interface generation engine 254 is configured to obtain a default or template interface and populate portions of the template interface with one or more of the recommended items 272. The interface generation engine 254 can be configured to generate an interface including all or a subset of the items included in the set of recommended items 272.

At step 210, the interface 274 is provided to the system that generated the original request 252. For example, where a user system 22a generates a request 252 for an interface, the generated interface 274, or instructions for generating the interface 274 locally, are provided to the user system 22a. The user system 22a is configured to display or render the interface 274 through one or more elements, such as a display, connected to or formed integrally with the user system 22a.

The task of identifying relevant content on an interface, such as navigating expansive electronic catalogs of items to locate specific items of interest can be burdensome and time consuming for users. Typically, a user can locate items within a catalog by navigating a browse structure, sometimes referred to as a "browse tree," in which interface pages or items are arranged in a predetermined hierarchy, such as by categories or sub-categories. Such browse trees typically include multiple hierarchical levels, requiring users to navigate through several levels of browse nodes or categories to identify items of interest. Thus, the user frequently has to perform numerous navigational steps to arrive at an interface pages containing items of interest.

Recommendation engines including a GCS model, as disclosed herein, significantly reduce this problem, allowing users to locate items of interest with fewer steps. For example, in some embodiments described herein, when a user is presented with an interface containing one or more items, each item includes, or is in the form of, a link to an interface page corresponding to the item of interest, e.g., a product or item page. Each item thus serves as a programmatically selected navigational shortcut to an interface page, allowing a user to bypass the navigational structure of the browse tree. Beneficially, programmatically identifying recommended items including navigation shortcuts, allowing a user to bypass the typical browse tree structure and improve the speed of the user's navigation through an electronic interface. This can be particularly beneficial for computing devices with small screens, where fewer interface elements can be displayed to a user at a time and thus navigation of larger volumes of data is more difficult.

The disclosed systems and methods, such as systems including a recommendation engine 260 configured to implement a GCS model 262, provide for exploration of new or under-utilized items in an item catalog (e.g., cold-start items) to build a retrieval set by leveraging multi-hop relationships across edges between cold-cold and cold-hot item pairs. The disclosed GCS models are scalable, with each of the elements of a GCS model being independently scalable and parallelizable. The disclosed systems and methods are extendible to additional attribute features, user interactions, and/or other parameters. For example, additional signals, such as search query data, co-bought item data, etc. can be incorporated into a GCS model to provide a more robust or differently tuned retrieval set.

The disclosed systems and methods, such as systems including a recommendation engine 260 configured to implement a GCS model 262, can be configured to solve various item recommendation problems in network interfaces. For example, in the context of an e-commerce interface, the disclosed recommendation engine 260 can be configured to address a cold-start item recommendation problem, e.g., how to improve the visibility or performance of new or cold (e.g., underutilized) items in a catalog. Similarly, the disclosed recommendation engine 260 can be configured to increase or improve visibility of third-party providers and/or third-party content, such as third-party sellers and third-party items, within an interface or associated catalog. As another example, in some embodiments, the disclosed recommendation engine 260 can be configured to address explore-exploit considerations regarding an item catalog, providing recommendations that are configured to explore user interests while simultaneously providing some exploitation of the existing knowledge base.

Figure 9:
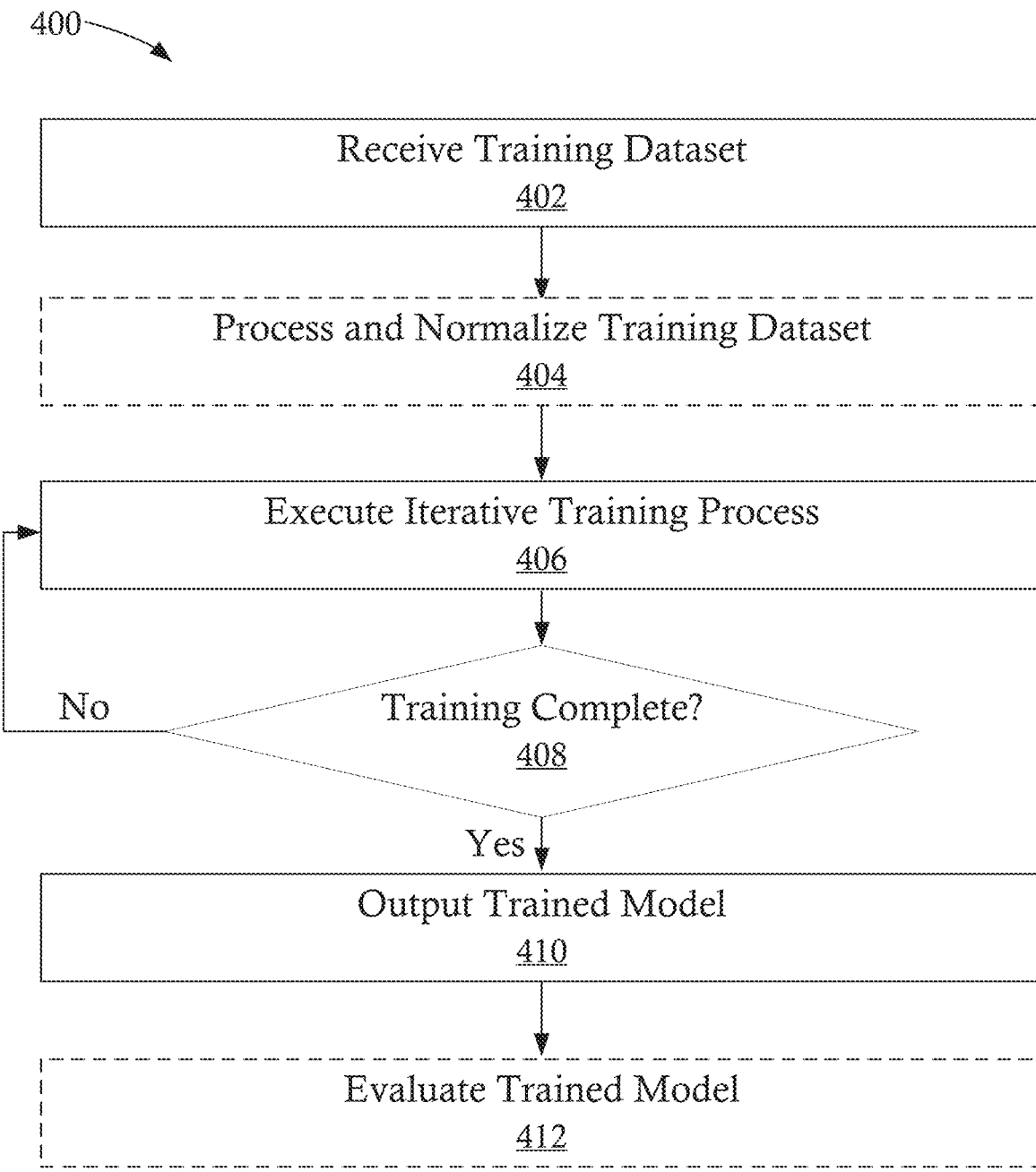
FIG. 9 is a flowchart illustrating a method of generating a trained machine learning model, in accordance with some embodiments.
Figure 10:
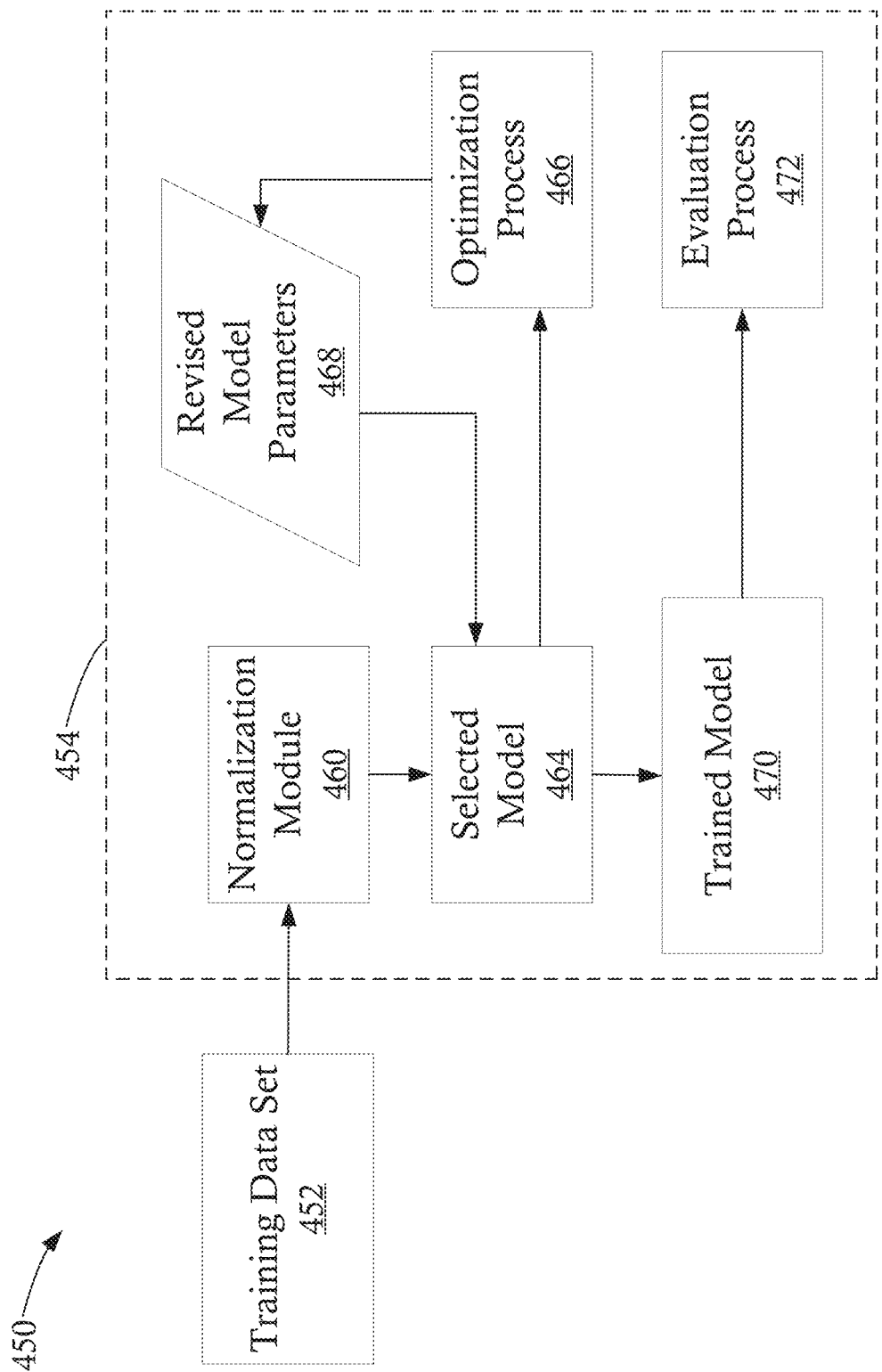
FIG. 10 is a process flow illustrating various steps of the method of generating a trained machine learning model, in accordance with some embodiments.

FIG. 9 is a flowchart illustrating a method 400 of generating a trained machine learning model, in accordance with some embodiments. FIG. 10 is a process flow 450 illustrating various steps of the method of generating a trained machine learning model, in accordance with some embodiments. At step 402, a training dataset 452 is received by model training engine 454. The training dataset 452 can include labeled and/or unlabeled data. For example, in various embodiments, a GCS model can be generated using labeled, unlabeled, and/or semi-labelled training data. The training dataset 452 includes data for training a GCS model and/or portions of a GCS model. For example, the training dataset 452 can include a set of unlabeled semantic data configured for generating a semantic encoding model such as sets of items or other semantic input configured for training a BERT model, a set of labeled graph data for training a graph traversal process such as a Personalized PageRank model, a set of labeled ranking data for generating a ranking model, and/or any other suitable data.

At optional step 404, the received training dataset 452 is processed and/or normalized by a normalization module 460. In some embodiments, processing of the received training dataset 452 includes outlier detection configured to remove data likely to skew training of a semantic mapping model, such as keywords or titles in a second language, numerical keywords, etc.

At step 406, an iterative training process is executed to train a selected model 464. For example, a model training engine 454 can be configured to obtain a selected model 464 including an untrained (e.g., base) machine learning model, such as an untrained semantic encoding model framework, an untrained graph traversal model framework, an untrained ranking model framework, and/or a partially or previously trained model (e.g., a prior version of a trained model, a partially trained model from a prior iteration of a training process, etc.), from a model store, such as a model store database 32. The model training engine 454 is configured to iteratively adjust parameters (e.g., hyperparameters) of the selected model 464 to minimize a cost value (e.g., an output of a cost function) for the selected model 464.

In some embodiments, the model training engine 454 implements an iterative training process that generates a set of revised model parameters 468 during each iteration. The set of revised model parameters 468 can be generated by applying an optimization process 466 to the cost function of the selected model 464. The optimization process 466 can be configured to reduce the cost value (e.g., reduce the output of the cost function) at each step by adjusting one or more parameters during each iteration of the training process.

After each iteration of the training process, at step 408, the model training engine 454 determines whether the training process is complete. The determination at step 408 can be based on any suitable parameters. For example, in some embodiments, a training process can complete after a predetermined number of iterations. As another example, in some embodiments, a training process can complete when it is determined that the cost function of the selected model 464 has reached a minimum, such as a local minimum and/or a global minimum.

At step 410, a trained model 470, such as a trained semantic encoding model, a trained graph traversal model, a trained Personalized PageRank model, etc., is generated and, at optional step 412, the trained model 470 can be evaluated by an evaluation process 472. The trained model 470 can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which can be made by those skilled in the art.

What is claimed is:

1. A computer-implemented method, comprising:
receiving a request for an interface;
generating, by a graph-based cold start (GCS) model, a sparse distance matrix and a co-viewed weighted matrix;
generating a set of interface items for inclusion in the interface, wherein the set of interface items is selected based at least in part on the GCS model including a semantic similarity component and a viewed-also-viewed component, wherein the set of interface items is generated based on a combination of an output of the semantic similarity component and an output of the viewed-also-viewed component, wherein the semantic similarity component generates the sparse distance matrix and the viewed-also-viewed component generates the co-viewed weighted sparse matrix, and wherein the GCS model combines the sparse distance matrix and the co-viewed weighted sparse matrix to generate a product graph adjacency matrix;

generating the interface including the set of interface items; and transmitting the interface to a system that generated the request for the interface.

2. The computer-implemented method of claim 1, wherein generating the sparse distance matrix comprises:
generating a distance matrix; and
removing values above a first predetermined threshold or below a second predetermined threshold from the distance matrix.

3. The computer-implemented method of claim 1, wherein the sparse distance matrix includes cosine distance values for each item pair in a catalog of items.

4. The computer-implemented method of claim 1, comprising generating, by the GCS model, an adjacency graph based on the combination of the sparse distance matrix and the co-viewed weighted matrix, and wherein the set of interface items is selected at least in part by a graph traversal process that traverses the adjacency graph.

5. The computer-implemented method of claim 4, wherein the graph traversal process includes a Personalized PageRank process.

6. The computer-implemented method of claim 1, wherein the GCS model generates a set of candidate items, wherein generating the set of interface items comprises generating, by a ranking model, a set of ranked items by ranking the candidate items, and wherein the set of interface items is selected in descending rank order from the set of ranked items.

7. The computer-implemented method of claim 1, wherein the sparse distance matrix is representative of a set of cold-start item recommendations and the co-viewed weighted matrix is representative of a set of hot item recommendations.

8. A non-transitory computer-readable medium storing instructions that, when executed by at least one processor, cause a device to execute operations comprising:
receiving a request for an interface;
generating, by a graph-based cold start (GCS) model, a sparse distance matrix and a co-viewed weighted matrix;
generating a set of interface items for inclusion in the interface, wherein the set of interface items is selected based at least in part on the GCS model including a semantic similarity component and a viewed-also-viewed component, wherein the set of interface items is generated based on a combination of an output of the semantic similarity component and an output of the viewed-also-viewed component, wherein the semantic similarity component generates the sparse distance matrix and the viewed-also-viewed component generates the co-viewed weighted sparse matrix, and wherein the GCS model combines the sparse distance matrix and the co-viewed weighted sparse matrix to generate a product graph adjacency matrix;
generating the interface including the set of interface items; and
transmitting the interface to a system that generated the request for the interface.

9. The non-transitory computer-readable medium of claim 8, wherein generating the sparse distance matrix comprises:
generating a distance matrix; and
removing values above a first predetermined threshold or below a second predetermined threshold from the distance matrix.

10. The non-transitory computer-readable medium of claim 8, wherein the sparse distance matrix includes cosine distance values for each item pair in a catalog of items.

11. The non-transitory computer-readable medium of claim 8, comprising generating, by the GCS model, an adjacency graph based on the combination of the sparse distance matrix and the co-viewed weighted matrix, and wherein the set of interface items is selected at least in part by a graph traversal process that traverses the adjacency graph.

12. The non-transitory computer-readable medium of claim 11, wherein the graph traversal process includes a Personalized PageRank process.

13. The non-transitory computer-readable medium of claim 8, wherein the GCS model generates a set of candidate items, wherein generating the set of interface items comprises generating, by a ranking model, a set of ranked items by ranking the candidate items, and wherein the set of interface items is selected in descending rank order from the set of ranked items.

14. The non-transitory computer-readable medium of claim 8, wherein the sparse distance matrix is representative of a set of cold-start item recommendations and the co-viewed weighted matrix is representative of a set of hot item recommendations.

15. A computer-implemented method, comprising:
receiving a request for an interface;
generating, by a graph-based cold start (GCS) model, a sparse distance matrix and a co-viewed weighted matrix, wherein generating the sparse distance matrix includes:
generating a distance matrix; and
removing values above a first predetermined threshold or below a second predetermined threshold from the distance matrix, wherein the sparse distance matrix includes cosine distance values for each item pair in a catalog of items;
generating a set of interface items for inclusion in the interface, wherein the set of interface items is selected based at least in part on the GCS model including a semantic similarity component and a viewed-also-viewed component, wherein the set of interface items is generated based on a combination of an output of the semantic similarity component and an output of the viewed-also-viewed component, wherein the semantic similarity component generates the sparse distance matrix and the viewed-also-viewed component generates the co-viewed weighted sparse matrix, and wherein the GCS model combines the sparse distance matrix and the co-viewed weighted sparse matrix to generate a product graph adjacency matrix;
generating the interface including the set of interface items; and
transmitting the interface to a system that generated the request for the interface.

16. The computer-implemented method of claim 15, comprising generating, by the GCS model, an adjacency graph based on the combination of the sparse distance matrix and the co-viewed weighted matrix, and wherein the set of interface items is selected at least in part by a graph traversal process traverses the adjacency graph.

17. The computer-implemented method of claim 16, wherein the graph traversal process includes a Personalized PageRank process.

18. The computer-implemented method of claim 15, wherein the GCS model generates a set of candidate items, wherein generating the set of interface items comprises generating, by a ranking model, a set of ranked items by ranking the candidate items, and wherein the set of interface items is selected in descending rank order from the set of ranked items.

19. The computer-implemented method of claim 15, wherein the sparse distance matrix is representative of a set of cold-start item recommendations and the co-viewed weighted matrix is representative of a set of hot item recommendations.

20. The computer-implemented method of claim 15, wherein the GCS model generates a set of candidate items, wherein generating the set of interface items comprises generating, by a ranking model, a set of ranked items by ranking the candidate items, wherein the set of interface items is selected in descending rank order from the set of ranked items, and wherein the sparse distance matrix is representative of a set of cold-start item recommendations and the co-viewed weighted matrix is representative of a set of hot item recommendations.

\* \* \* \* \*